(12) United States Patent
Saito et al.

(10) Patent No.: US 7,600,927 B2
(45) Date of Patent: Oct. 13, 2009

(54) OPTICAL SPLICER, OPTICAL MODULE, AND METHOD OF PRODUCING OPTICAL SPLICER

(75) Inventors: Kazuhito Saito, Yokohama (JP); Mitsuaki Tamura, Yokohama (JP); Maki Ikeji, Yokohama (JP); Hiroshi Kohda, Yokohama (JP); Eiichiro Yamada, Yokohama (JP)

(73) Assignee: Sumitomo Electric Industries, Ltd., Osaka (JP)

(*) Notice: Subject to any disclaimer, the term of this patent is extended or adjusted under 35 U.S.C. 154(b) by 0 days.

(21) Appl. No.: 11/980,405

(22) Filed: Oct. 31, 2007

(65) Prior Publication Data
US 2008/0267567 A1    Oct. 30, 2008

Related U.S. Application Data

(62) Division of application No. 11/057,385, filed on Feb. 15, 2005, now abandoned.

(30) Foreign Application Priority Data
Feb. 16, 2004    (JP) ............................ P2004-038880

(51) Int. Cl.
*G02B 6/255* (2006.01)
*G02B 6/38* (2006.01)

(52) U.S. Cl. ............................... 385/95; 385/99; 385/71
(58) Field of Classification Search .................. 385/51, 385/52, 63, 65, 71, 95, 99
See application file for complete search history.

(56) References Cited

U.S. PATENT DOCUMENTS

| 5,351,331 | A | 9/1994 | Chun et al. |
| 5,719,978 | A | 2/1998 | Kakii et al. |
| 6,415,075 | B1 | 7/2002 | DeRosa et al. |
| 6,766,662 | B2 * | 7/2004 | Morishita et al. ............ 65/110 |
| 6,939,060 | B2 * | 9/2005 | Tamura et al. ............... 385/96 |
| 2004/0017987 | A1 | 1/2004 | Yamada et al. |

FOREIGN PATENT DOCUMENTS

| JP | 02-111905 | 4/1990 |
| JP | 11-030731 | 2/1999 |
| JP | 2000-275454 | 10/2000 |
| JP | 3154230 | 4/2001 |

OTHER PUBLICATIONS

Japanese Office Action, with English Translation, issued in Japanese Patent Application No. JP 2004-038880, mailed on Mar. 18, 2008.

* cited by examiner

*Primary Examiner*—Kevin S Wood
(74) *Attorney, Agent, or Firm*—McDermott Will & Emery LLP

(57) ABSTRACT

An optical splicer 2 according to an embodiment of the present invention has a plurality of optical fibers 6, and an optical splice member 8 having a plurality of fiber holes 14 in each of which a portion including one end 6a of each fiber 6 is inserted, and a mode field diameter W1 in one end 6a of optical fiber 6 is enlarged relative to a mode field diameter W2 in the other portion of optical fiber 6.

3 Claims, 10 Drawing Sheets

Fig.5
(a)
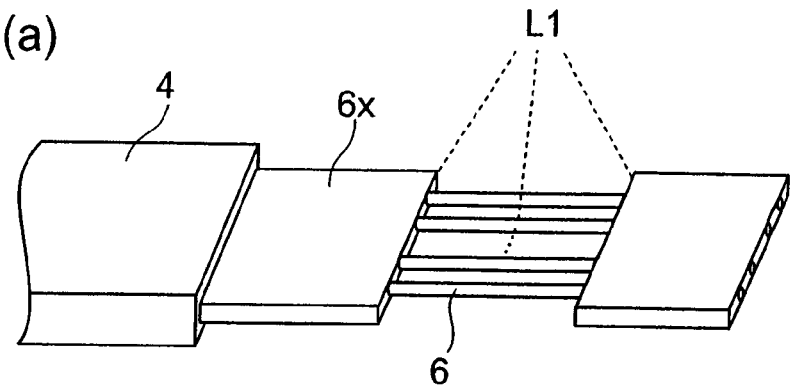
(b)
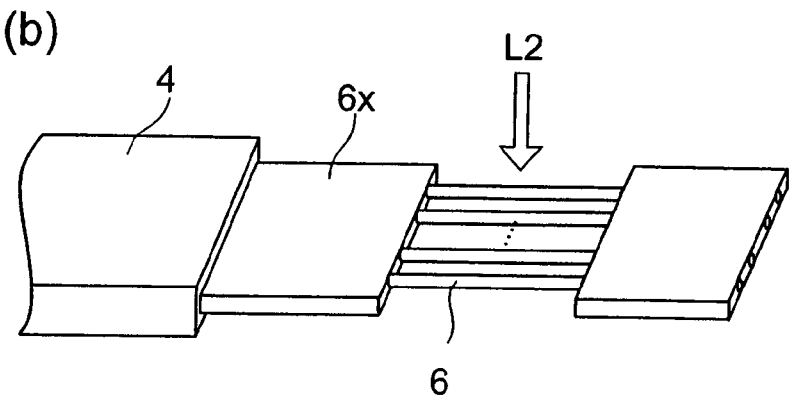
(c)
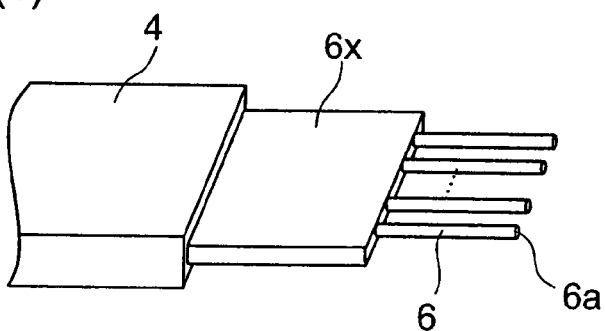
(d)
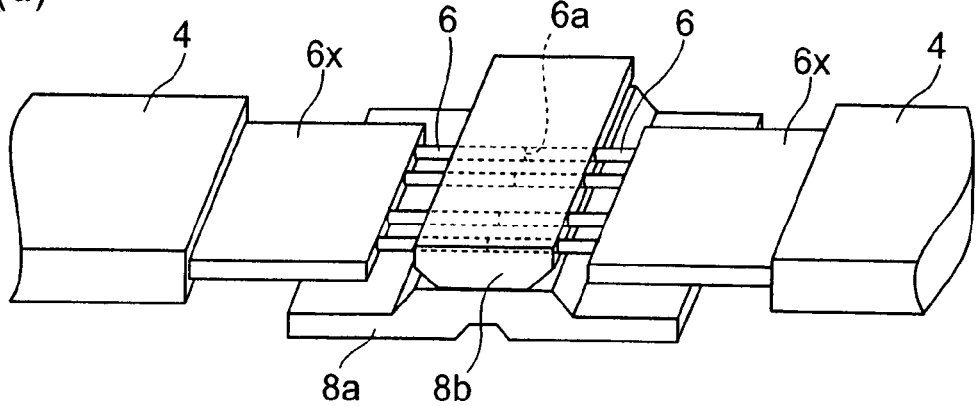

OPTICAL SPLICER, OPTICAL MODULE, AND METHOD OF PRODUCING OPTICAL SPLICER

This application is a Divisional of U.S. application Ser. No. 11/057,385, filed Feb. 15, 2005, now abandoned claiming priority of Japanese Application No. 2004-038880, filed Feb. 16, 2004, the entire contents of each of which are hereby incorporated by reference.

BACKGROUND OF THE INVENTION

1. Field of the Invention

The present invention relates to an optical splicer for splicing optical fibers, an optical module, and a method of producing the optical splicer.

2. Related Background of the Invention

There are optical splicers for splicing optical fibers by inserting the optical fibers in glass capillaries face to face.

For example, Japanese Patent No. 3154230 describes the optical splicer for splicing a plurality of optical fibers, which comprises a plurality of glass capillaries. In this optical splicer, the central region of each glass capillary is preliminarily filled with an index matching agent.

Japanese Patent Publication No. 7-50219 describes the optical splicer in which a predetermined space is provided between end faces of face-to-face optical fibers and in which the space is filled with an elastic adhesive to effect a splice of the optical fibers.

SUMMARY OF THE INVENTION

In the aforementioned optical splicer described in Japanese Patent No. 3154230, where the end face of each fiber is not in a good state (i.e., where each optical fiber is not accurately cut at the end face), there will arise axial misalignment or a clearance between end faces of optical fibers. In consequence, a splice loss will be large in the optical splice with partner fibers.

In the aforementioned optical splicer described in Japanese Patent Publication No. 7-50219, the space is provided between end faces of optical fibers. Since an optical signal emerging from an optical fiber divergently propagates in this space, the splice loss must also be large.

An object of the present invention is therefore to provide an optical splicer capable of reducing the splice loss in collective splicing of multiple optical fibers, an optical module, and a method of producing the optical splicer.

An optical splicer according to the present invention is an optical splicer comprising: a plurality of optical fibers; and an optical splice member having a plurality of fiber holes in each of which a portion including one end of each optical fiber is inserted; wherein a mode field diameter in the one ends of the optical fibers is enlarged relative to a mode field diameter in the other portions of the optical fibers.

When the optical splicer of this configuration is used to implement collective splicing of multiple fibers, the optical fibers are inserted from both sides of the fiber holes of the optical splice member so as to face each other. Since the mode field diameter in the one ends of the optical fibers (the ends to be spliced with partner optical fibers) is enlarged relative to the mode field diameter in the other portions of the optical fibers, the numerical aperture (NA) of the optical fibers is small, so as to suppress the spread of light propagating between the optical fibers facing each other in the fiber holes. For this reason, even if there is a clearance or axial misalignment due to variations in angles of end faces and in positions of end faces between two optical fibers facing each other, the fibers can be spliced with each other with a low loss. Therefore, the splice loss can be reduced in collective splicing of multiple fibers even if the end faces of the optical fibers are not cut with high accuracy.

Preferably, the portions including the one ends of two optical fibers are inserted in each of the fiber holes so as to face each other from both sides of the optical splice member and a space between end faces of the two optical fibers facing each other in the fiber holes is filled with an adhesive having a refractive index matched with a refractive index of cores of the optical fibers. Since in this case the space between the end faces of two facing fibers is filled with the adhesive having the refractive index matched with that of the cores of the optical fibers, reflection of light can be suppressed in the space between two facing fibers. This can reduce the splice loss more in collective splicing of multiple fibers.

Preferably, the portions including the one ends of the optical fibers are inserted in the fiber holes from only one side of the optical splice member and end faces of the optical fibers are covered by an adhesive in the fiber holes. When the end faces of the optical fibers are covered by the aforementioned adhesive in the fiber holes as in this configuration, the end faces are coated with an antireflection coating. Namely, light emerging from the end faces of optical fibers is scattered by the adhesive layer, which can prevent the light from returning as reflected light to the optical fibers.

Preferably, the adhesive is an ultraviolet-curable adhesive and the optical splice member is made of a material that transmits ultraviolet light. In this configuration, the adhesive can be cured, for example, under irradiation with ultraviolet light supplied from the outside of the optical splice member, so that the end faces of the optical fibers facing each other in the fiber holes can be bonded to each other without difficulties and in a short time.

Preferably, the optical splice member comprises a substrate having guide grooves for guiding the one ends of the optical fibers, and a retainer mounted on the substrate, for retaining the portions including the one ends of the optical fibers, against the substrate, and the fiber holes are formed by the guide grooves and the retainer. In this case, for example, if the retainer is constructed so as to cover the region except for the both ends of the guide grooves in the upper surface of the substrate, the one ends of the optical fibers can be inserted along the guide grooves into the fiber holes. Therefore, the optical fibers can be readily inserted into the fiber holes.

Preferably, the plurality of optical fibers is comprised of an optical fiber ribbon of multiple fibers, and the portions including the one ends of the optical fibers are a part exposed by removing a coating of the optical fiber ribbon. The use of the optical fiber ribbon facilitates construction of an optical module incorporating multiple optical fibers.

An optical module according to the present invention is an optical module comprising: the optical splicer as set forth; and at least one optical device having an optical waveguide optically connected to the other end of each optical fiber. When the optical splicer is provided in this manner, the optical fibers can be spliced with each other with a low loss even if there is a clearance or axial misalignment due to variations in angles of end faces and in positions of end faces between two facing optical fibers, as described above.

A production method of an optical splicer according to the present invention is a method of producing an optical splicer, the method comprising: a step of removing a part of a coating of an optical fiber ribbon of multiple fibers to expose a plurality of optical fibers; a step of enlarging a mode field diameter of the optical fibers; a step of cutting portions with the enlarged mode field diameter in the optical fibers; and a step of inserting the optical fibers into fiber holes of an optical splice member, after the step of cutting the optical fibers.

By this production method, the portions where the mode field diameter is enlarged in the optical fibers are inserted into the fiber holes of the optical splice member. For this reason, where two optical fibers are brought into a face-to-face state in each fiber hole, the optical fibers can be spliced with each other with a low loss even if there is a clearance or axial misalignment due to variations in angles of end faces and in positions of end faces between two facing fibers, as described above. Therefore, the splice loss can be reduced in collective splicing of multiple fibers even if the end faces of the fibers are not cut with high accuracy.

BRIEF DESCRIPTION OF THE DRAWINGS

FIG. 5 is an illustration showing production steps of optical splicer 2.

DESCRIPTION OF THE PREFERRED EMBODIMENTS

The preferred embodiments of the optical splicer, the optical module, and the production method of the optical splicer according to the present invention will be described below with reference to the drawings.

Figure 1:
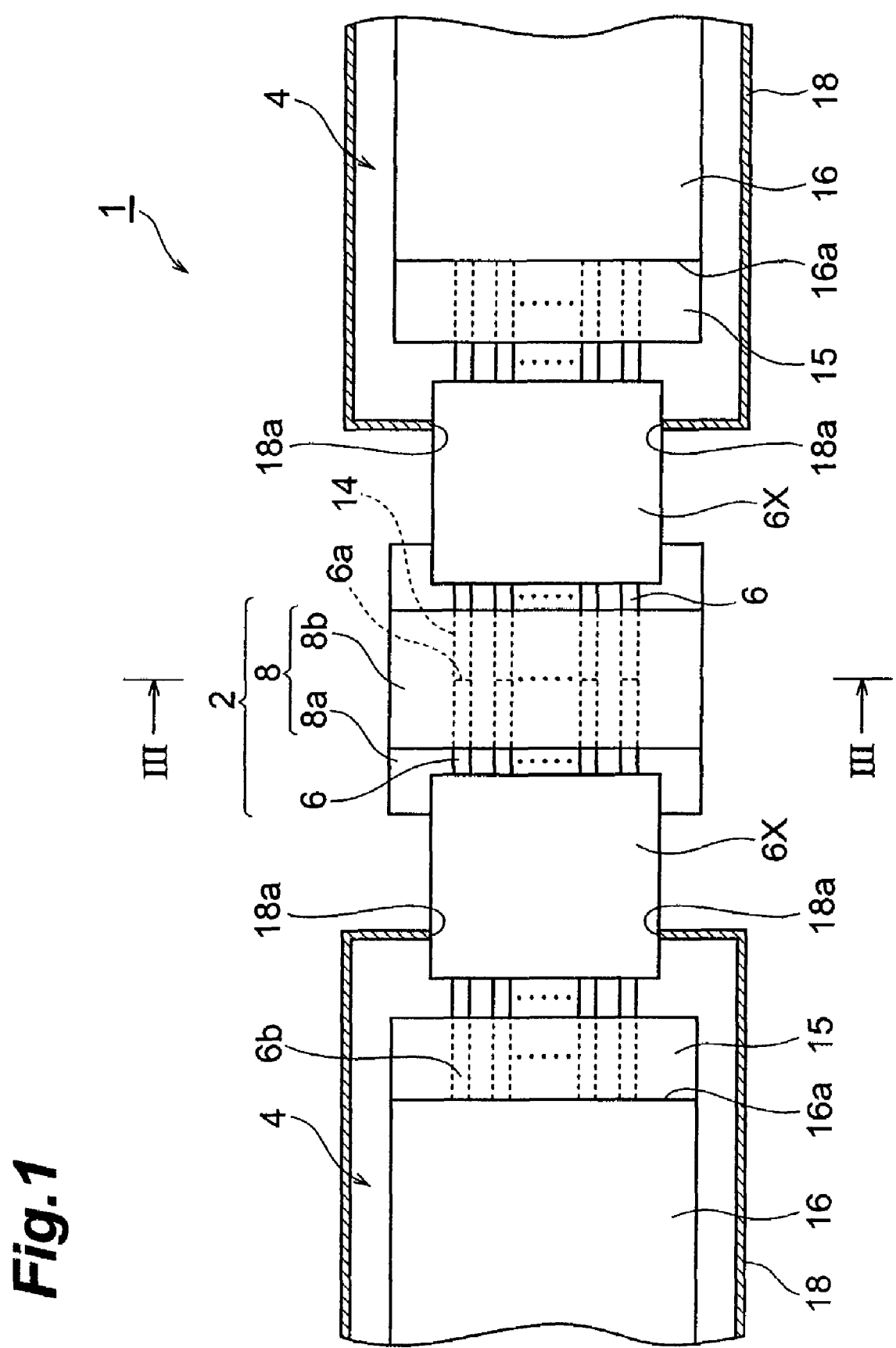
FIG. 1 is a plan view including a sectional view in part, which shows an optical module incorporating an embodiment of the optical splicer according to the present invention.
Figure 2:
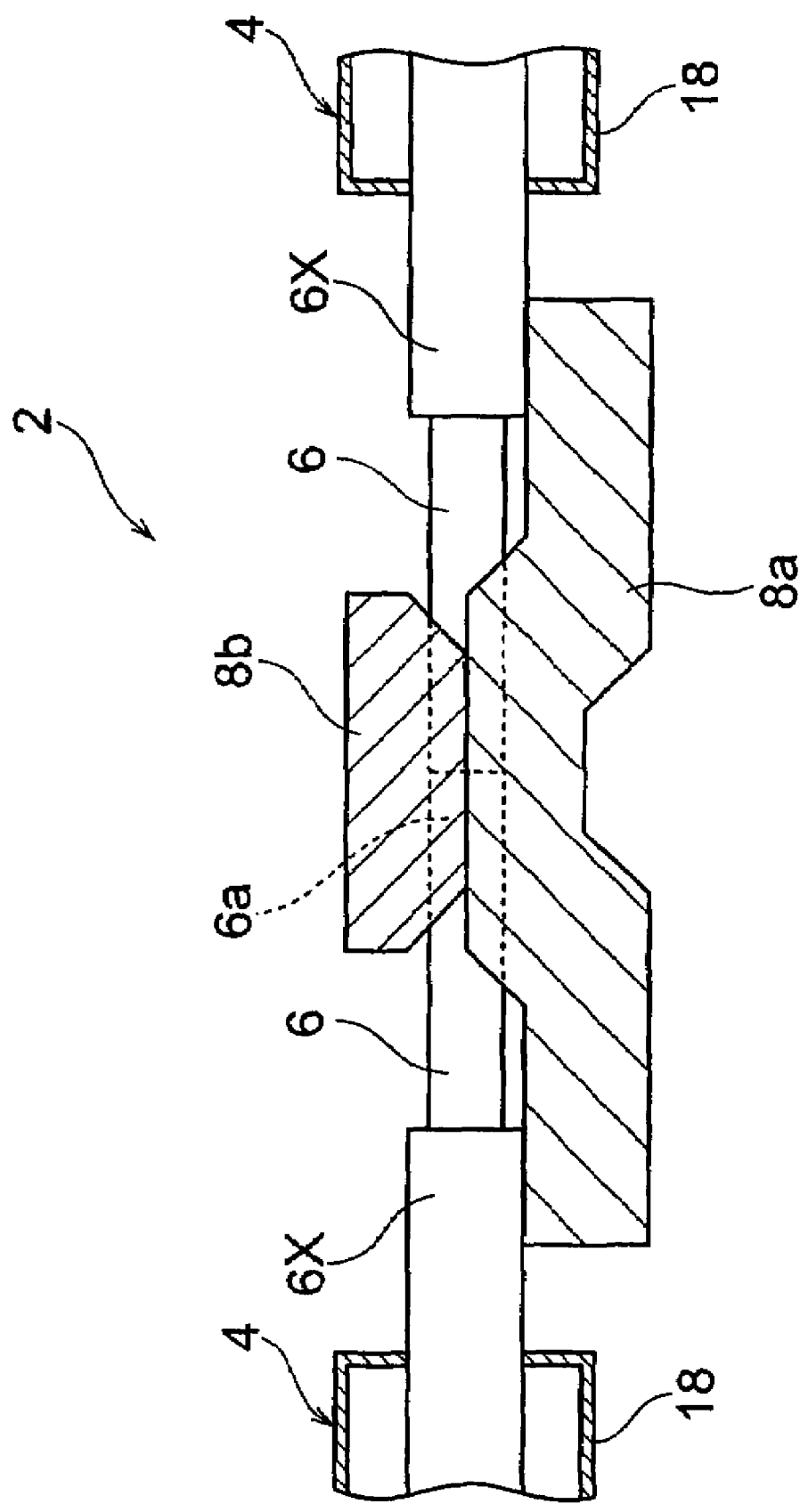
FIG. 2 is a vertical sectional view of the optical module shown in FIG. 1.
Figure 3:
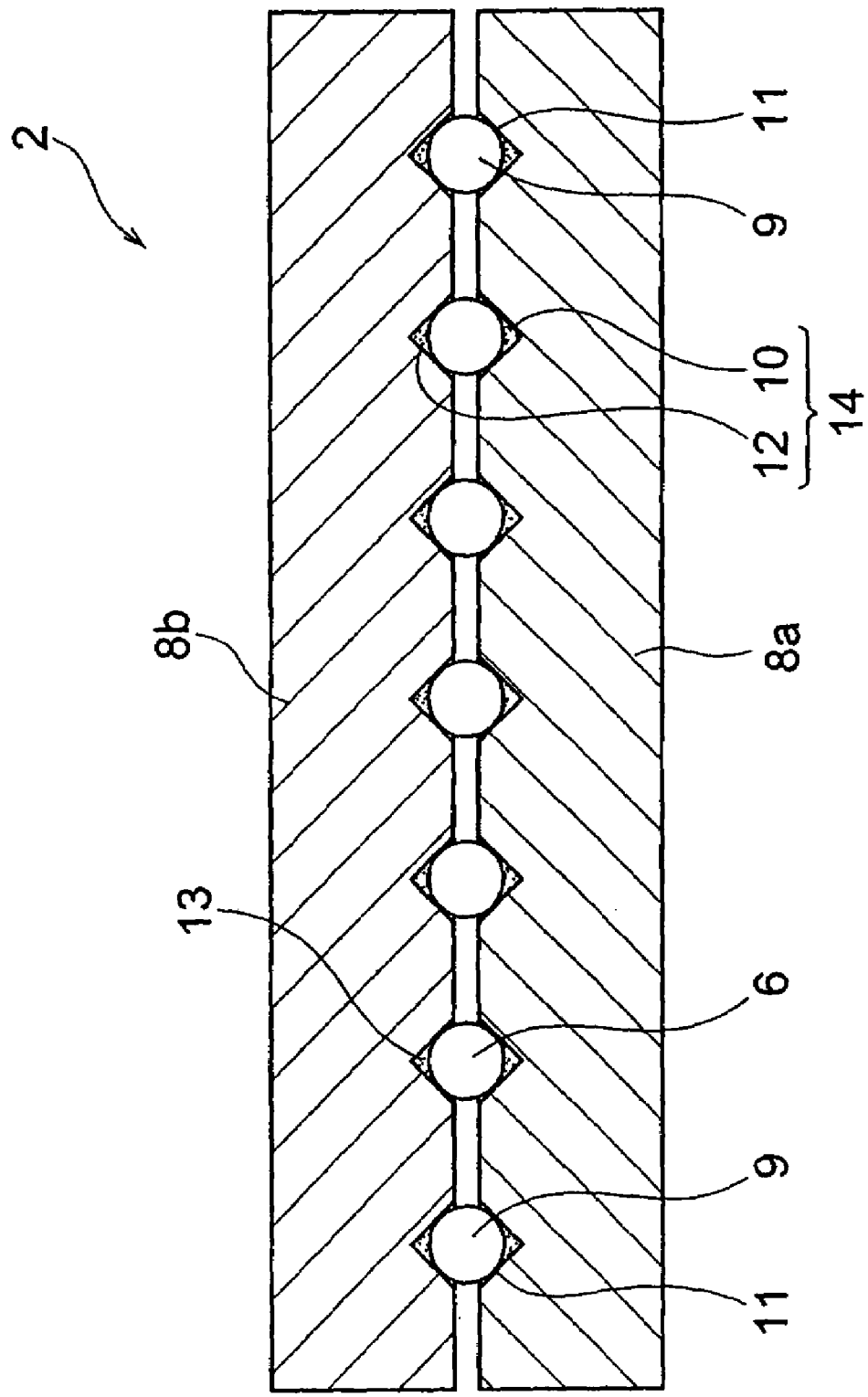
FIG. 3 is a sectional view along line III-III in FIG. 1.
Figure 4:
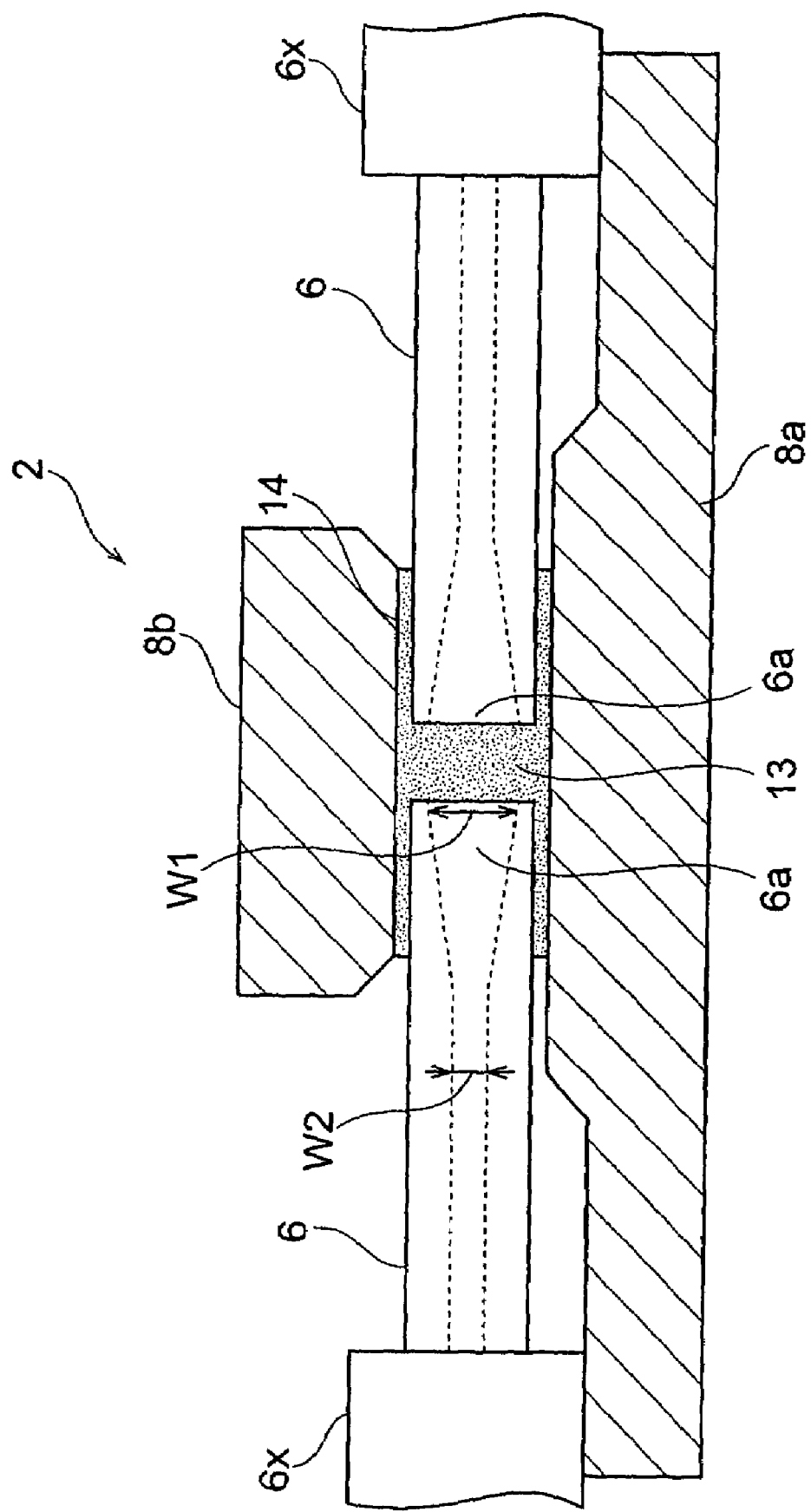
FIG. 4 is a vertical, enlarged, sectional view of the optical splicer.

FIG. 1 is a plan view including a cross section in part, which shows an optical module incorporating an embodiment of the optical splicer according to the present invention, FIG. 2 a vertical sectional view of the optical module shown in FIG. 1, and FIG. 3 a sectional view along line III-III in FIG. 1. FIG. 4 is a vertical, enlarged, sectional view of optical splicer 2.

As shown in each figure, the optical module 1 of the present embodiment has an optical splicer 2 and two optical devices 4. The optical splicer 2 is a device for splicing two optical devices 4 with each other.

The optical splicer 2 has an optical splice member 8 for collectively splicing a plurality of optical fibers 6 with a plurality of partner fibers 6. The plurality of optical fibers 6 are, for example, single-mode optical fibers. The plurality of optical fibers 6 are constructed in the form of optical fiber ribbon 6x of multiple fibers. The coating is removed from the both ends of the optical fiber ribbon 6x, to expose each optical fiber 6. As shown in FIG. 4, the mode field diameter (core diameter) W1 in one ends 6a of optical fibers 6 is enlarged relative to the mode field diameter W2 in the other portions of optical fibers 6. More specifically, the mode field diameter W2 is approximately 10 μm, whereas the mode field diameter W1 is at most approximately 20-40 μm. This enlargement of the mode field diameter is implemented by heating the optical fibers 6 (as will be described later).

The optical splice member 8 is composed of a fiber array substrate 8a and a retainer 8b. The fiber array substrate 8a and the retainer 8b are made, for example, of a material such as glass which readily transmits ultraviolet light.

As shown in FIG. 3, a plurality of V-shaped guide grooves 10 for retaining and positioning optical fibers 6 are provided in the upper surface of the fiber array substrate 8a. In addition, positioning grooves 11 for accommodating positioning pins 9 are provided on both sides of the guide grooves 10 in the upper surface of the fiber array substrate 8a. The positioning pins 9 are pins for positioning the retainer 8b relative to the fiber array substrate 8a, and have the outer diameter equal to or slightly larger than the outer diameter of the optical fibers 6. The positioning grooves 11 are also formed in V-shape as the guide grooves 10 are. This facilitates the fabrication of the fiber array substrate 8a including the guide grooves 10 and positioning grooves 11.

The retainer 8b is located so as to cover part of the optical fibers 6 placed on the fiber array substrate 8a, and is provided with a plurality of V-shaped retaining grooves 12 corresponding to the guide grooves 10 and positioning grooves 11. The retainer 8b is fixed to the fiber array substrate 8a, for example, with an adhesive. The guide grooves 10 of the fiber array substrate 8a and the retaining grooves 12 of the retainer 8b form fiber holes 14 in which respective fibers 6 are inserted.

As shown in FIG. 4, one ends 6a of two optical fibers 6 are inserted in each fiber hole 14 so as to face each other from both sides of optical splice member 8. The space between the end faces of one ends 6a of two optical fibers 6 is filled with a UV-curable adhesive 13 having the refractive index matched with that of the cores of the optical fibers 6. The UV-curable adhesive 13 is comprised of a material such as epoxy resin or acrylic resin, for example. This UV-curable adhesive 13 also fills the space between the optical splice member 8 and the optical fibers 6. The UV-curable adhesive 13 is cured with ultraviolet light supplied from the outside of the optical splice member 8, so that the end faces in one ends 6a of two optical fibers 6 and, the optical splice member 8 and optical fibers 6 are bonded to be fixed to each other. By using the UV-curable adhesive 13 in this manner, the end faces in one ends 6a of optical fibers 6 can be bonded to each other without difficulties and in a short time.

As shown in FIG. 1, each optical device 4 comprises an optical fiber array 15, a planar optical waveguide 16, and a housing 18. The optical fiber array 15 and planar optical waveguide 16 are placed in the housing 18. An optical fiber ribbon 6x is introduced into the housing 18. The optical fiber array 15 holds the other ends 6b of respective optical fibers 6 exposed from the optical fiber ribbon 6x. The planar optical waveguide 16 has a plurality of lightguide cores (not shown), the optical fiber array 15 is fixed to the end face 16a of the planar optical waveguide 16, and the optical fibers 6 held by the optical fiber array 15 are positioned relative to the lightguide cores.

FIG. 5 is an illustration showing production steps of optical splicer 2. It is assumed herein that an optical fiber ribbon 6x is preliminarily connected to each optical device 4. The optical splicer 2 is produced according to the following procedure.

An ozone beam L1 is applied from above the optical fiber ribbon 6x to etch the intermediate part of the optical fiber ribbon 6x (FIG. 5(a)). This results in removing the coating from the intermediate part of the optical fiber ribbon 6x to expose the bare bodies (glass parts) of multiple optical fibers 6. Here the length of the exposed parts of optical fibers 6 (the length of the removed coating of the optical fiber ribbon 6x) is preferably 3-10 mm and more preferably 5-7 mm. By keeping the bare bodies of optical fibers 6 short in this manner, it is feasible to prevent the optical fibers 6 from being readily broken during the production process.

Subsequently, in order to enlarge the mode field diameter of exposed optical fibers 6, the surfaces of the bare bodies of exposed optical fibers 6 are heated by $CO_2$ laser L2 (FIG. 5(b)). Then the dopant component in the cores of the exposed optical fibers 6 thermally diffuses toward the cladding to change the index profile of the glass parts. This results in enlarging the mode field diameter of the exposed optical fibers 6. In the case of the ordinary single-mode optical fibers, it is possible to enlarge the mode field diameter up to 40 μm. The heating of the optical fibers 6 may be implemented by use of a burner or a heater, instead of the $CO_2$ laser L2.

Subsequently, the optical fibers 6 with the mode field diameter thus enlarged are cut at the position where the mode field diameter enlarged is maximum, by a cutter or the like (FIG. 5(c)). After the cutting, portions including one ends 6a of optical fibers 6 are inserted into fiber holes 14 of optical splice member 8 so as to face partner optical fibers 6 (FIG. 5(d)). Then the UV-curable adhesive 13 is poured into the fiber holes 14 from the both ends of the retainer 8b, and the optical fibers 6 are bonded to the partner optical fibers 6 and to the optical splice member 8 with this UV-curable adhesive 13.

Incidentally, the most common fiber splicing technology is the fusion splice technology. The fusion splice technology requires the end faces of the optical fibers to be cut with high accuracy, in order to implement low-loss splicing of optical fibers, and the fibers needs to be spliced with failure in cutting of end faces (retrial) always in mind. Specifically, an extra length is always left in the optical fibers on the occasion of splicing the optical fibers with each other, so as to allow a splice work to be again performed using the extra length part of the optical fibers even if there occurs a failure in cutting the end faces of optical fibers to cause a failure in fusion splicing. However, an extra storage space is necessary for securing the extra length of optical fibers, and thus, in the case of an optical module having a plurality of optical devices, a sufficient extra storage space has to be provided, which will be great hindrance against miniaturization of the optical module. Furthermore, there are restrictions on the bending radius of the optical fibers (30 mm or less), and circumstances do not allow reduction of the extra storage space.

In contrast to it, since the present embodiment adopts the configuration wherein the mode field diameter in one ends 6a of optical fibers 6 is enlarged, the numerical aperture of optical fibers 6 becomes smaller by that degree, and light propagating between two optical fibers 6 is close to parallel light. Since this suppresses dispersion of power density of light, optical fibers 6 can be spliced with each other with a low loss even if there is a clearance or axial misalignment due to variations in angles of end faces and in positions of end faces between two facing fibers 6.

Since the space between two facing fibers 6 is filled with the UV-curable adhesive 13 having the refractive index matched with that of the cores of the optical fibers 6, the splice loss can be reduced more and reflection of light can be reduced in the clearance between two optical fibers. Therefore, good splice characteristics can be achieved even with irregularities in the end faces of multiple fibers 6. Therefore, the present embodiment obviates the need for accurately cutting the end faces of optical fibers 6 and the need for securing the extra length of the optical fibers 6 as in the fusion splice.

In addition, the length of the bare bodies of optical fibers 6 can be shorter in the process of enlarging the mode field diameter of optical fibers 6 than in the case of discharge heating during the fusion splice, and thus the length of optical splice member 8 can be short. This can reduce the splice spacing between two optical devices 4, so that the size of optical module 1 can be dramatically reduced.

Figure 6:
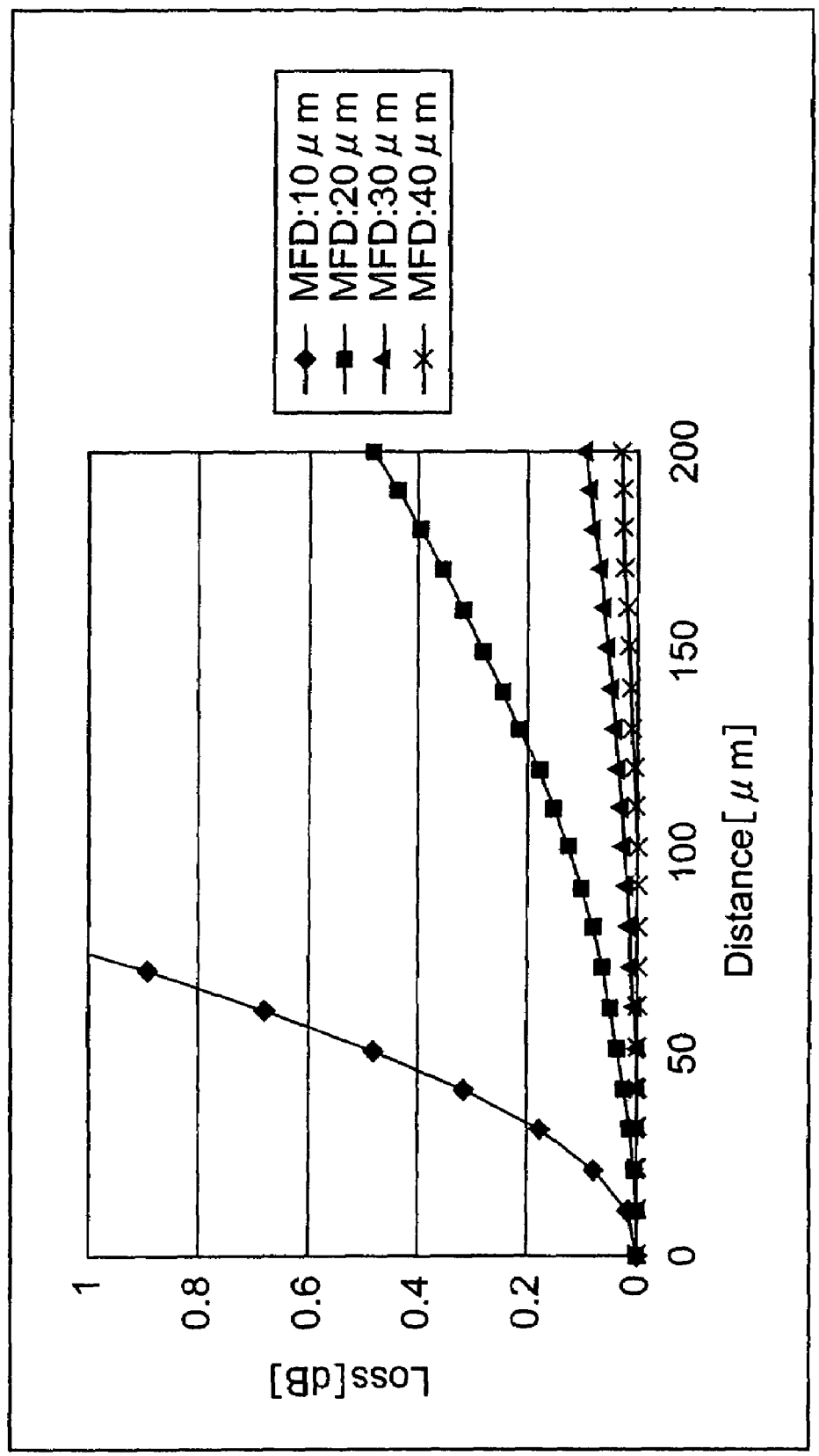
FIG. 6 is a graph showing the relationship among the mode field diameter in one ends of two facing fibers, the distance between end faces in the one ends of the two optical fibers, and the splice loss.

FIG. 6 is a graph showing the relationship among the maximum of the mode field diameter (MFD) in one ends 6a of two facing fibers 6, the distance between end faces of one ends 6a of the two fibers 6, and the splice loss, in the aforementioned optical splicer 2. The graph of FIG. 6 shows the case where the wavelength of the optical signal transmitted on the optical fibers 6 is 1.55 μm and where the refractive index of optical fibers 6 is 1.444. As shown in FIG. 6, the splice loss increases with increase in the distance between end faces of one ends 6a of two optical fibers 6. On the other hand, the rate of the increase of splice loss decreases with increase in the maximum of the mode field diameter. For this reason, the mode field diameter is particularly preferably enlarged so that the maximum thereof becomes not less than 30 μm. In this case, the splice loss is not more than 0.2 dB even if the distance is 200 μm between end faces of one ends 6a of two optical fibers 6.

Figure 7:
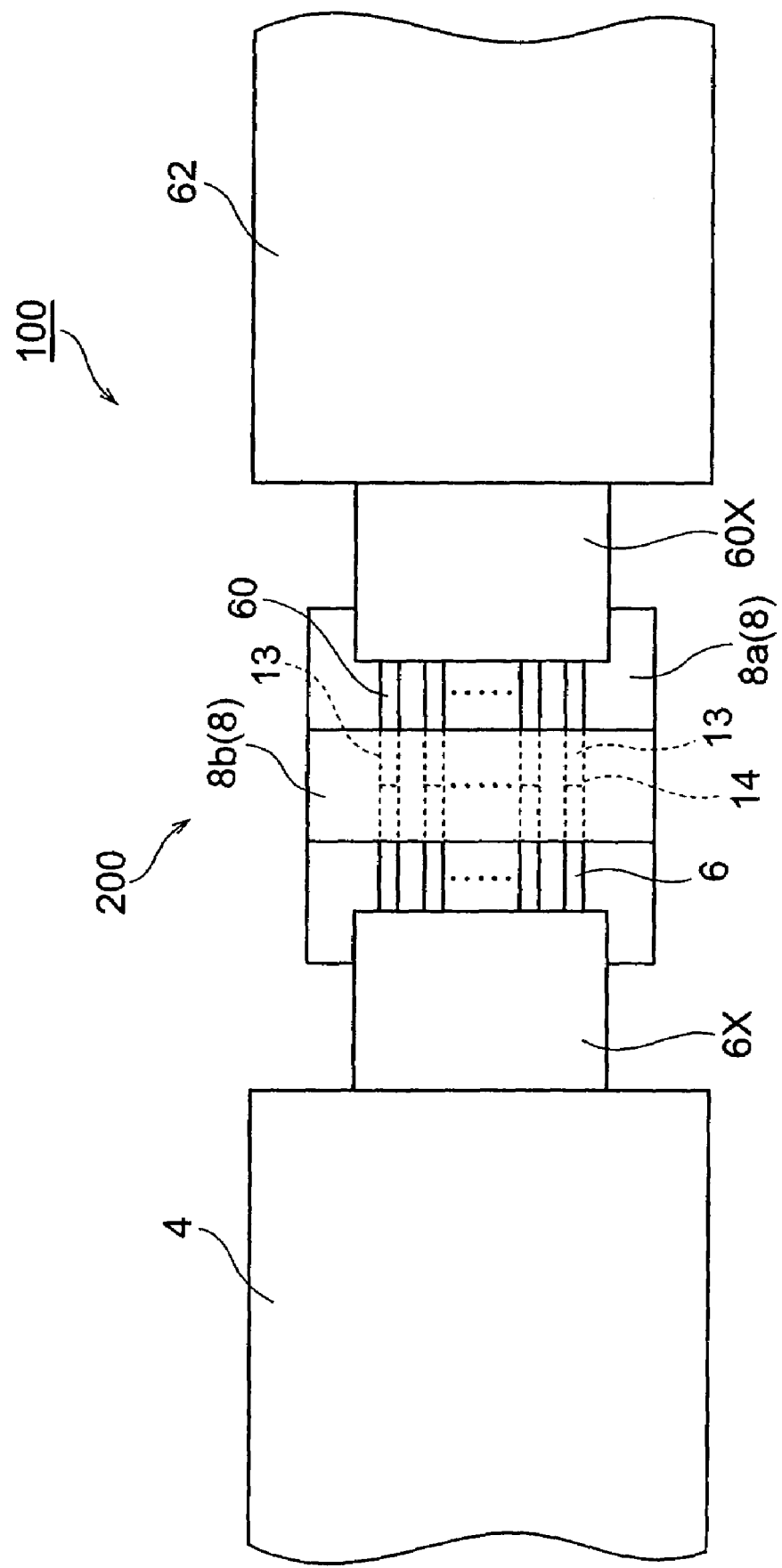
FIG. 7 is a plan view showing an optical module incorporating another embodiment of the optical splicer according to the present invention.
Figure 8:
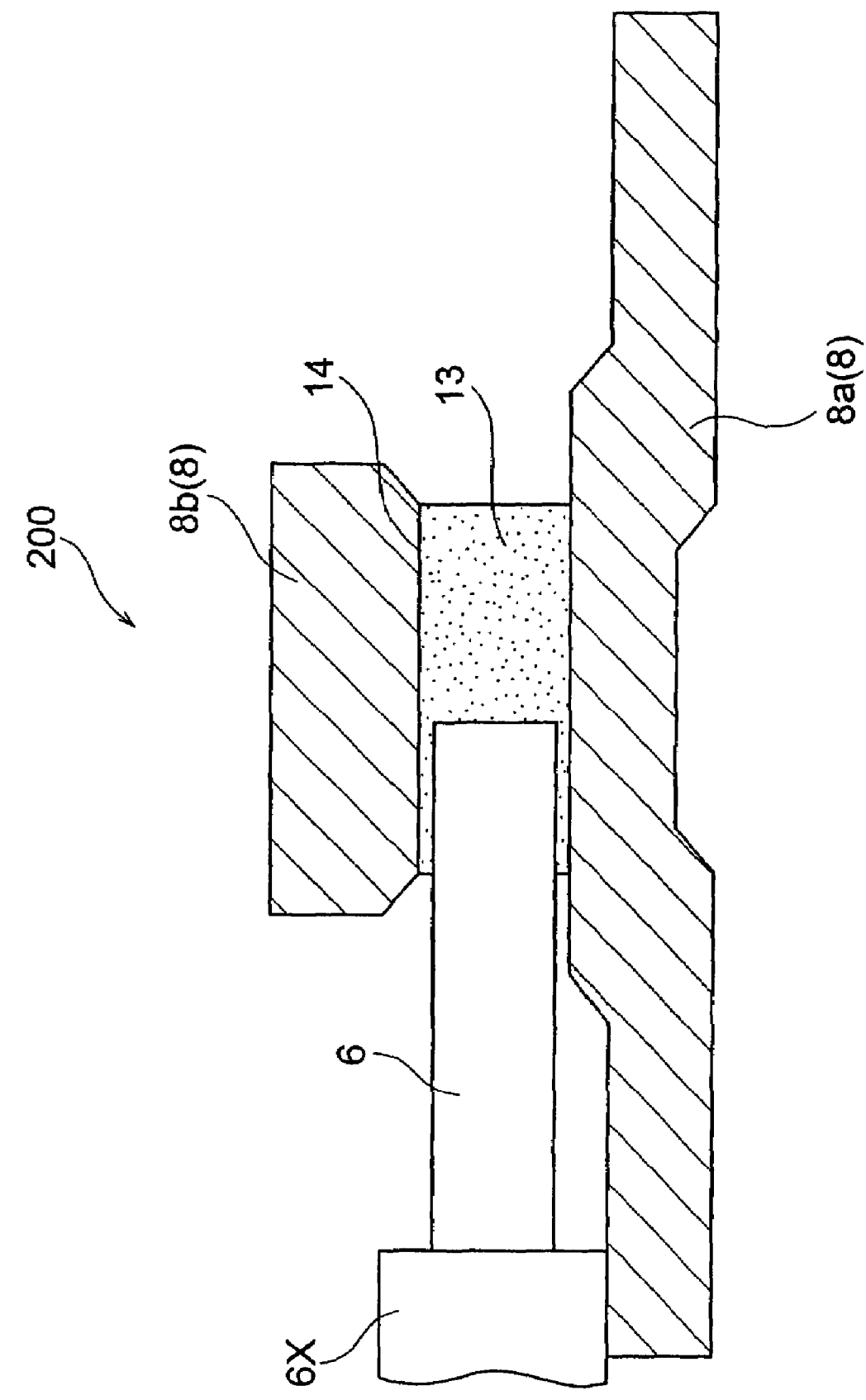
FIG. 8 is a vertical, enlarged, sectional view showing the major part of the optical splicer shown in FIG. 7.

FIG. 7 is a plan view showing an optical module incorporating another embodiment of the optical splicer according to the present invention, and FIG. 8 a vertical, enlarged, sectional view showing the major part of the optical splicer shown in FIG. 7. In the drawings, identical or equivalent members to those in the above-described embodiment are denoted by the same reference symbols, without redundant description thereof.

As shown in each figure, the optical module 100 of the present embodiment has an optical splicer 200, and this optical splicer 200 has an optical splice member 8 similar to that in the aforementioned embodiment. The optical splice member 8 collectively splices some of multiple fibers 6 with partner fibers 60 led out of optical device 62. Namely, the partner fibers 60 are constructed in the form of an optical fiber ribbon 60x including less optical fibers than those of the optical fiber ribbon 6x. The optical fibers 60 are inserted in some of fiber holes 14 in the optical splice member 8. Namely, the optical fibers 6 and optical fibers 60 are inserted in some of fiber holes 14 so as to face each other from both sides of the optical splice member 8, and only optical fibers 6 are inserted in the remaining fiber holes 14. In the fiber holes 14, the space between end faces of optical fibers 6 and optical fibers 60 is filled with the UV-curable adhesive 13 as described above.

In addition, the end faces of optical fibers 6 without connection partners in the fiber holes 14 are covered by the UV-curable adhesive 13. As the end faces are covered by the UV-curable adhesive 13 in this manner, the end faces of optical fibers 6 are coated with an antireflection coating. Therefore, light emerging from the end faces of optical fibers 6 is scattered by the layer of UV-curable adhesive 13, whereby the light is prevented from undergoing unwanted reflection on the end faces of the optical fibers 6 and from returning to the optical fibers 6.

The present invention can be modified in various ways, without having to be limited to the above-described embodiments.

Figure 9:
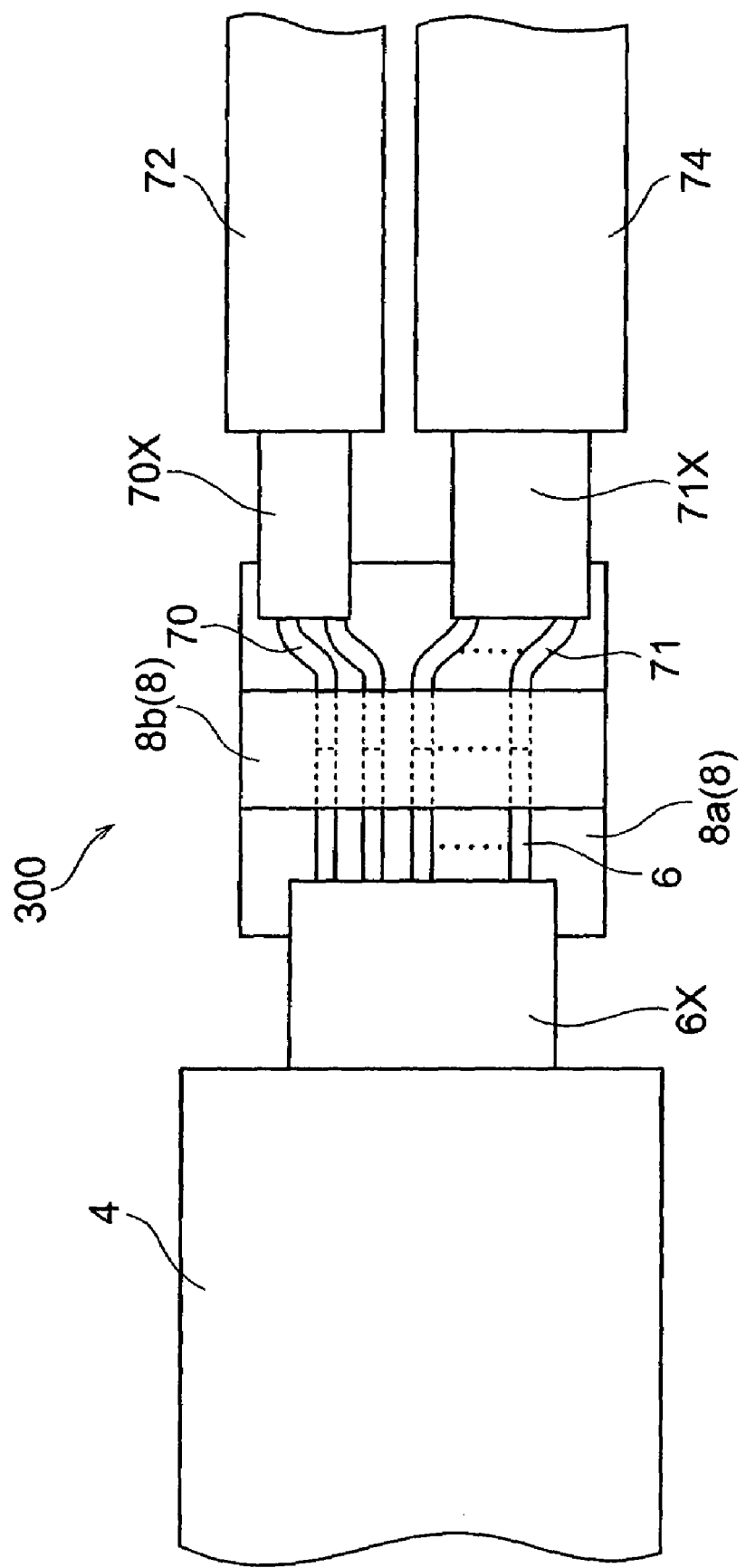
FIG. 9 is a plan view showing an optical module incorporating still another embodiment of the optical splicer according to the present invention.

FIG. 9 is a plan view showing an optical module incorporating still another embodiment of the optical splicer according to the present invention. In FIG. 9, an optical splice member 8 of optical splicer 300 collectively splices optical fibers 6 of an optical fiber ribbon 6x with optical fibers 70, 71 of optical fiber ribbons 70x, 71x. The optical fiber ribbons 70x, 71x are spliced with their respective optical devices 72, 74.

Figure 10:
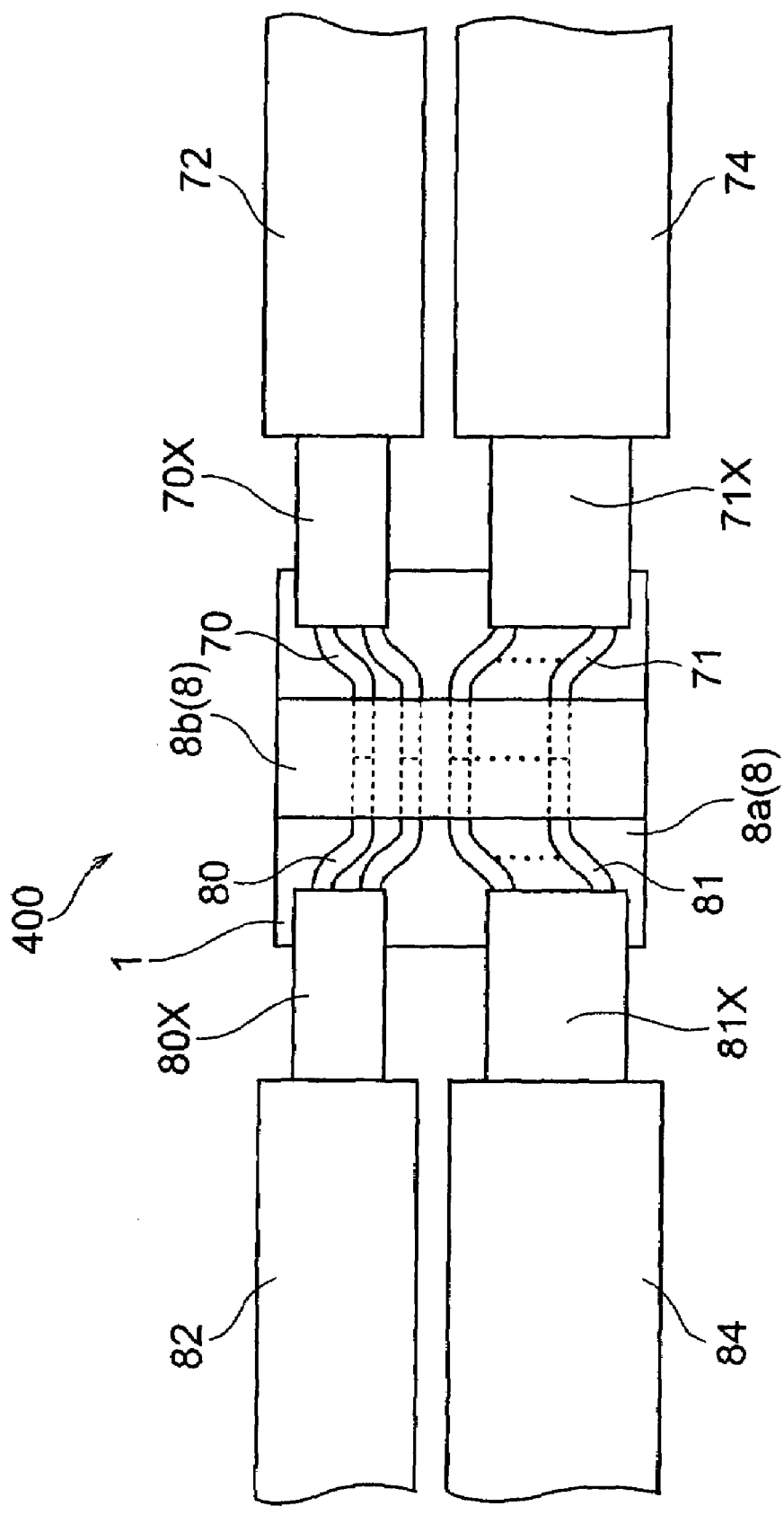
FIG. 10 is a plan view showing an optical module incorporating still another embodiment of the optical splicer according to the present invention.

FIG. 10 is a plan view showing an optical module incorporating still another embodiment of the optical splicer according to the present invention. In FIG. 10, an optical splice member 8 of optical splicer 400 collectively splices optical fibers 80, 81 of optical fiber ribbons 80x, 81x with optical fibers 70, 71 of optical fiber ribbons 70x, 71x. The optical fiber ribbons 80x, 81x are spliced with their respective optical devices 82, 84, and the optical fiber ribbons 70x, 71x with their respective optical devices 72, 74.

In the above embodiments the optical splice member 8 was comprised of the fiber array substrate 8a and the retainer 8b, but the optical splice member may be comprised of an integrated combination of the fiber array substrate and the retainer.

As the preferred embodiments of the present invention were described above, the present invention successfully achieves the reduction of the splice loss in collective splicing of multiple fibers.

What is claimed is:

1. A method of producing an optical fiber connector, the method comprising:
   removing a part of a coating of a first optical fiber ribbon of multiple fibers to expose a first plurality of first optical fibers, each of the first optical fibers having a first end portion and a second end portion;
   removing a part of a coating of a second optical fiber ribbon of multiple fibers to expose a second plurality of second optical fibers less than the first plurality of first optical fibers, each of the second optical fibers having a first end portion and a second end portion;
   enlarging a mode field diameter of the first end portion of the first and second optical fibers so that the mode field diameters of the first and second optical fibers become over 30 μm;
   providing an optical fiber connecting unit having a first side and a second side opposite to each other, and a plurality of through holes extending from the first side to the second side of the optical fiber connecting unit;
   inserting each of the first plurality of optical fibers into one of the through holes from the first side of the optical fiber connecting unit;
   inserting each of the second optical fibers into one of the through holes from the second side of the optical fiber connecting unit such that the first end portion of at least one of the second optical fibers faces the first end portion of at least one of the first optical fibers with keeping distance between end faces thereof being over 200 μm, and such that at least one of the first optical fibers does not face any of the second optical fibers; and
   covering end faces of the first end portions of the first and second optical fibers facing each other and an end face of the first end portions of said at least one of the first optical fibers that does not face any of the second optical fibers with an adhesive having a refractive index matched with a refractive index of cores of the optical fibers in the fiber hole.

2. An optical fiber connector comprising:
   an optical fiber connecting unit having a first side and a second side opposite to each other, and a plurality of holes extending from the first side into the optical fiber connecting unit; and
   a first plurality of first optical fibers, each first optical fiber having a first end portion and a second end portion, a mode field diameter of the first end portion of each first optical fiber being enlarged relative to that of the second end portion thereof, the mode field diameter of the first end portion of each first optical fiber being not smaller than 30 μm, and each of the first end portions of the optical fibers being located in one of the holes; and
   an adhesive located in the holes and having a refractive index matched with a refractive index of cores of the optical fibers, the adhesive covering end faces of the first end portions of the first optical fibers, wherein:
   the holes are through holes extending from the first side to the second side of the optical fiber connecting unit; and
   at least one of the first optical fibers is located in through holes without facing another optical fiber; and
   at least one the first optical fibers is located in the through hole with facing another optical fiber with distance between the end faces thereof being over 200 μm.

3. An optical fiber connector comprising:
   an optical fiber connecting unit having a first side and a second side opposite to each other, and a plurality of holes extending from the first side into the optical fiber connecting unit; and
   a first plurality of first optical fibers, each first optical fiber having a first end portion and a second end portion, a mode field diameter of the first end portion of each first optical fiber being enlarged relative to that of the second end portion thereof, the mode field diameter of the first end portion is over 30 μm, and each of the first end portions of the optical fibers being located in one of the holes;
   a second plurality of second optical fibers to be spliced to the first optical fibers; and
   an adhesive located in the one of the holes and having a refractive index matched with a refractive index of cores of the optical fibers, the adhesive covering end faces of the first end portions of the first optical fibers,
   wherein:
   the holes are through holes extending from the first side to the second side of the optical fiber connecting unit;
   the first plurality of first optical fibers is greater than the second plurality of second optical fibers;
   each of the second optical fibers to be spliced has a first end portion and a second end portion, a mode field diameter of the first end portion of each of the second optical fibers being enlarged relative to that of the second end portion thereof, the mode field diameter of the first end portion of the second optical fiber is over 30 μm and the first end portion of at least one of the first optical fibers and the first end portion of at least one of the second optical fibers being located in through holes facing each other with a distance therebetween being over 200 μm;
   at least one of the first optical fibers being located in through holes without facing a second optical fiber; and
   the adhesive located in the through holes has a refractive index matched with a refractive index of cores of the first and second optical fibers, the adhesive covering end faces of the first end portions of the first and second optical fibers facing each other, and the adhesive covering an end face of the first optical fiber not facing the second optical fiber.

* * * * *